(12) United States Patent
Kaita et al.

(10) Patent No.: US 7,196,031 B2
(45) Date of Patent: *Mar. 27, 2007

(54) CATALYST COMPOSITION

(75) Inventors: Shojiro Kaita, Saitama (JP); Zhaomin Hou, Saitama (JP); Yasuo Wakatsuki, Saitama (JP)

(73) Assignee: Riken, Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/233,593

(22) Filed: Sep. 4, 2002

(65) Prior Publication Data

US 2003/0018144 A1    Jan. 23, 2003

Related U.S. Application Data

(62) Division of application No. 09/701,581, filed as application No. PCT/JP00/01188 on Mar. 1, 2000, now Pat. No. 6,596,828.

(30) Foreign Application Priority Data

Mar. 4, 1999  (JP) .................................. 11-57073
Aug. 27, 1999 (JP) ................................ 11-241737
Sep. 6, 1999  (JP) ................................ 11-251076

(51) Int. Cl.
*C08F 4/6392*  (2006.01)
*C08F 4/622*   (2006.01)
*C08F 4/623*   (2006.01)
*C08F 236/10*  (2006.01)

(52) U.S. Cl. .................. 502/152; 502/103; 526/160; 526/164; 526/165; 526/134; 526/340

(58) Field of Classification Search ............... 502/128, 502/152, 103; 526/160, 164, 165, 134, 340, 526/943

See application file for complete search history.

(56) References Cited

U.S. PATENT DOCUMENTS

| 5,332,794 | A |   | 7/1994  | Ohtsu et al.   |
|-----------|---|---|---------|----------------|
| 5,444,134 | A |   | 8/1995  | Matsumoto      |
| 5,563,219 | A |   | 10/1996 | Yasuda et al.  |
| 5,670,587 | A | * | 9/1997  | Takeuchi et al.|
| 5,744,415 | A | * | 4/1998  | Wenzel         |
| 6,124,410 | A |   | 9/2000  | Ito et al.     |
| 6,310,164 | B1| * | 10/2001 | Morizono et al. ........... 526/339 |
| 6,664,208 | B1| * | 12/2003 | Fujita et al. ................ 502/132 |

FOREIGN PATENT DOCUMENTS

| EP | 0 667 357 A1 | 8/1995  |
| JP |    6-41232   | 2/1994  |
| JP |   6-256429   | 9/1994  |
| JP |   8-245711   | 9/1996  |
| JP |  10-324707   | 12/1998 |
| WO | WO 97/42160  | 11/1997 |

OTHER PUBLICATIONS

"Stereospecific Polymerization of 1,3-Butadiene with Samarocene-Based Catalysts", Macromolecules, 1999, 32, 9078-9079.

* cited by examiner

*Primary Examiner*—Caixia Lu
(74) *Attorney, Agent, or Firm*—Millen, White, Zelano & Branigan, P.C.

(57) ABSTRACT

A catalyst composition for polymerization of a conjugated diene or copolymerization of a conjugated diene and an aromatic vinyl compound, which comprises the following components: (A) a metallocene-type complex of a rare earth metal compound (samarium complex etc.), and (B) an ionic compound composed of a non-coordinate anion and a cation (triphenylcarbonium tetrakis(pentafluorophenyl)borate etc.) and/or an aluminoxane. The catalyst composition is useful for producing a polymer having a high cis-1,4-configuration content in the microstructure and a narrow molecular weight distribution.

17 Claims, No Drawings

CATALYST COMPOSITION

TECHNICAL FIELD

The present invention relates to a catalyst composition for polymerization of a conjugated diene and a co-catalyst contained in the catalyst composition. The invention also relates to a method for preparing a conjugated diene polymer using the catalyst composition and a novel conjugated diene polymer obtained by the preparation method.

The present invention further relates a catalyst composition for the copolymerization of a conjugated diene and an aromatic vinyl compound and a co-catalyst contained in the catalyst composition. The invention also relates to a method for preparing a copolymer of a conjugated diene and an aromatic vinyl compound using the catalyst composition and a novel copolymer obtained by the preparation method.

BACKGROUND ART

Various proposals have been made so far as to polymerization catalysts for conjugated dienes, and they play a highly important role in industrial fields. In particular, various polymerization catalysts which give a high cis-1,4-linkage content have been studied and developed to obtain conjugated diene polymers with enhanced performance in thermal and mechanical properties. For example, complex catalyst systems containing a compound of a transition metal such as nickel, cobalt and titanium as a main component are known, and some of them have already been widely used in industrial applications as polymerization catalysts for butadiene, isoprene etc. (see, End. Ing. Chem., 48, 784, 1956; Japanese Patent Publication No. 37-8198).

In order to attain a higher cis-1,4-linkage content and superior polymerization activity, complex catalyst systems which consist of a rare earth metal compound and an organometallic compound belonging to Group I to Group III have been studied and developed, and highly stereospecific polymerization has come to be actively studied (Makromol. Chem. Suppl, 4, 61, 1981; J. Polym. Sci., Polym. Chem. Ed., 18, 3345, 1980; German Patent Application No. 2,848,964; Sci. Sinica., 2/3, 734, 1980; Rubber Chem. Technol., 58, 117, 1985 etc.). Among these catalyst systems, complex catalysts containing a neodymium compound and an organoaluminum compound as main components were revealed to give a high cis-1,4-linkage content and have superior polymerization activity. The catalysts have already been used in industrial applications as polymerization catalysts for butadiene etc. (see Macromolecules, 15, 230, 1982; Makromol. Chem., 94, 119, 1981).

With the recent progress of industrial technologies, requirements for polymeric materials as commercial products have become increasingly higher, and development of polymeric materials which have still higher thermal properties (thermal stability etc.) and mechanical properties (tensile modulus, bending modulus etc.) has come to be strongly desired. As one of promising means for achieving the object, there have been attempts to produce a polymer of a high cis-1,4-configuration content in microstructure and a narrow molecular weight distribution by using a catalyst having a high polymerization activity for conjugated dienes. However, no method has so far been found for producing polymers having such characteristics.

Further, various proposals have been made hitherto also as to catalysts for copolymerization of a conjugated diene and an aromatic vinyl compound, and they play an extremely important industrial role. In particular, various copolymerization catalysts which give a high cis-1,4-linkage content have been studied and developed to obtain copolymers of a conjugated diene and an aromatic vinyl compound with enhanced performance in thermal and mechanical properties.

For example, there are known complex catalyst systems containing a compound of transition metal such as nickel, cobalt and titanium (see Kogyo Kagaku Zasshi (Journal of Industrial Chemistry), 72, 2081, 1969; Plast. Kautsch., 40, 356, 1993; Makromol. Chem. Phys., 195, 2623, 199 etc.), complex catalyst systems containing a compound of rare earth metal such as neodymium and gadolinium (Macromol. Rapid Commun. 16, 563, 1992; J. Polym. Sci., ParA; Polym. Chem., 32, 1195, 1994; Polymer, 37, 349, 1996) and the like. Although these catalyst systems exhibit a relatively high cis-1,4-controllability, polymers with a high molecular weight and narrow molecular weight distribution, and copolymers with randomized monomer sequence cannot be obtained by means of these catalysts.

DISCLOSURE OF THE INVENTION

An object of the present invention is to provide a catalyst for the polymerization of a conjugated diene. More specifically, the object is to provide a catalyst for producing polymers with a high cis-1,4-configuration content in the microstructure and a narrow molecular weight distribution. Another object of the present invention is to provide polymers having the aforementioned characteristics, and a method for producing such polymers.

Further object of the present invention is to provide a catalyst for copolymerization of a conjugated diene and an aromatic vinyl compound. More specifically, the object is to provide a catalyst for producing copolymers with high cis-1,4-configuration content in the microstructure, a high molecular weight and a narrow molecular weight distribution. Another object of the present invention is to provide copolymers having the aforementioned characteristics, and a method for producing such copolymers.

The inventors of the present invention conducted various studies to achieve the foregoing objects. As a result, they found that a conjugated diene can be efficiently polymerized by using a catalyst composition comprising a rare earth metal metallocene type polymerization catalyst and a co-catalyst comprising an ionic compound composed of a non-coordinate anion and a cation and/or an aluminoxane in combination, and that a conjugated diene polymer with an extremely high cis-1,4-configuration content in the microstructure and a narrow molecular weight distribution can be produced by using the aforementioned catalyst composition for polymerization.

Moreover, the inventors of the present invention also found that a conjugated diene and an aromatic vinyl compound can be efficiently copolymerized by using a catalyst composition comprising a rare earth metal metallocene-type polymerization catalyst and a co-catalyst containing an ionic compound composed of a non-coordinate anion and a cation and/or an aluminoxane in combination, and that, by using the aforementioned catalyst composition for copolymerization, a copolymer with an extremely high cis-1,4-configuration content in the microstructure as well as a high molecular weight and a narrow molecular weight distribution, preferably a random copolymer with a randomized monomer sequence, can be produced by copolymerizing a conjugated diene and an aromatic vinyl compound. The present invention was achieved on the basis of these findings.

The present invention thus provides a catalyst composition for polymerization of a conjugated diene, which comprises the following components: (A) a metallocene type complex of a rare earth metal compound, and (B) an ionic compound composed of a non-coordinate anion and a cation and/or an aluminoxane. According to preferred embodiments of the present invention, there are provided the aforementioned catalyst composition, wherein the metallocene type complex is a samarium complex; the aforementioned catalyst composition, wherein the ionic compound is triphenylcarbonium tetrakis(pentafluorophenyl)borate, triphenylcarbonium tetrakis(tetrafluorophenyl)borate, N,N-dimethylanilinium tetrakis(pentafluorophenyl)borate or 1,1'-dimethylferrocenium tetrakis(pentafluorophenyl)borate; and the aforementioned catalyst composition, which further contains an organometallic compound of an element belonging to Group I to Group III in the periodic table.

According to a further aspect of the present invention, there is provided a co-catalyst for use in combination with a catalyst containing a metallocene type complex of a rare earth metal compound for polymerization of a conjugated diene, which comprises an ionic compound composed of a non-coordinate anion and a cation and/or an aluminoxane. According to further aspects of the present invention, there are provided a method for polymerization of a conjugated diene wherein the polymerization is performed in the presence of the aforementioned catalyst composition for polymerization; and a polymer which is obtainable by polymerization of a conjugated diene in the presence of the aforementioned catalyst composition for polymerization. In addition, there is also provided a polymer wherein a cis-1,4-configuration content in the microstructure is 80 mol % or more, preferably 90 mol % or more, further preferably 95 mol % or more, and most preferably 98 mol % or more, and a molecular weight distribution Mw/Mn is 2.00 or less, preferably 1.80 or less, more preferably 1.60 or less, further preferably 1.40 or less, and most preferably 1.30 or less. The above polymer can be produced by polymerizing a conjugated diene in the presence of the aforementioned catalyst composition for polymerization.

According to a further aspect of the present invention, there is provided a catalyst composition for copolymerization of a conjugated diene and an aromatic vinyl compound, which contains the following components: (A) a metallocene type complex of a rare earth metal compound, and (B) an ionic compound composed of a non-coordinate anion and a cation and/or an aluminoxane. According to preferred embodiments of the present invention, there are provided the aforementioned catalyst composition, wherein the metallocene type complex is a samarium complex; the aforementioned catalyst composition, wherein the ionic compound is triphenylcarbonium tetrakis(pentafluorophenyl)borate, triphenylcarbonium tetrakis(tetrafluorophenyl)borate, N,N-dimethylanilinium tetrakis(pentafluorophenyl)borate or 1,1'-dimethylferrocenium tetrakis(pentafluorophenyl)borate; and the aforementioned catalyst composition, which further contains an organometallic compound of an element belonging to Group I to Group III in the periodic table.

According to a further aspect of the present invention, there are provided a co-catalyst for use in combination with a catalyst containing a metallocene type complex of a rare earth metal compound for copolymerization of a conjugated diene and an aromatic vinyl compound, which comprises an ionic compound composed of a non-coordinate anion and a cation and/or an aluminoxane. According to further aspects of the present invention, there are provided a method for copolymerization of a conjugated diene and an aromatic vinyl compound wherein the copolymerization is performed in the presence of the aforementioned catalyst composition for polymerization; and a copolymer which can be obtained by copolymerization of a conjugated diene and an aromatic vinyl compound in the presence of the aforementioned catalyst composition.

In addition, there is also provided a copolymer wherein a cis-1,4-configuration content in the microstructure is 80 mol % or more, preferably 90 mol % or more, and most preferably 95 mol % or more; a molecular weight Mn is 10,000 or more, preferably 20,000 or more, further preferably 50,000 or more, and most preferably 100,000 or more, and a molecular weight distribution Mw/Mn is 2.50 or less, preferably 2.00 or less, more preferably 1.80 or less, and most preferably 1.50 or less. This copolymer can be produced by copolymerizing a conjugated diene and an aromatic vinyl compound in the presence of the aforementioned catalyst composition for copolymerization.

BEST MODE FOR CARRYING OUT THE INVENTION

Examples of the metallocene type complex of a rare earth metal compound include divalent or trivalent rare earth metal compounds represented by the general formula (I): $R_a MX_b \cdot L_c$ or the general formula (II): $R_a MX_b QX_b$ wherein M represents a rare earth metal; R represents cyclopentadienyl group, a substituted cyclopentadienyl group, indenyl group, a substituted indenyl group, fluorenyl group, or a substituted fluorenyl group; X represents hydrogen atom, a halogen atom, an alkoxide group, a thiolate group, an amido group, or a hydrocarbon group having 1 to 20 carbon atoms; L represents a Lewis base compound; Q represents an element belonging to Group III in the periodic table; a represents an integer of 1, 2 or 3; b represents an integer of 0, 1 or 2; and c represents an integer of 0, 1 or 2.

In the aforementioned general formula (I), an element selected from those of atomic numbers 57 to 71 in the periodic table can be used as the rare earth metal represented by M. Specific examples of the rare earth metal include lanthanium, cerium, praseodymium, neodymium, promethium, samarium, europium, gadolinium, terbium, dysprosium, holmium, erbium, thulium, ytterbium and lutetium. Among them, samarium is preferred. When the symbol "a" is 2, two of "R" may be the same or different from each other. Similarly, when the symbol "b" or "c" is 2, two of "X" or "L" may be the same or different from each other.

The types, numbers, and substituting positions of one or more substituent of the substituted cyclopentadienyl group, substituted indenyl group, and substituted fluorenyl group are not particularly limited. Examples of the substituent include, for example, methyl group, ethyl group, n-propyl group, isopropyl group, n-butyl group, isobutyl group, sec-butyl group, tert-butyl group, hexyl group, phenyl group and benzyl group, as well as hydrocarbon groups containing a silicon atom such as trimethylsilyl group. R may be bound to a part of X by means of a bridging group such as dimethylsilyl group, dimethylmethylene group, methylphenylmethylene group, diphenylmethylene group, ethylene group, and substituted ethylene group, and two of R may be bound to each other by means of a bridging group such as dimethylsilyl group, dimethylmethylene group, methylphenylmethylene group, diphenylmethylene group, ethylene group, and substituted ethylene group.

Specific examples of the substituted cyclopentadienyl group include, for example, methylcyclopentadienyl group, benzylcyclopentadienyl group, vinylcyclopentadienyl group, 2-methoxyethylcyclopentadienyl group, trimethylsilylcyclopentadienyl group, tert-butylcyclopentadienyl group, ethylcyclopentadienyl group, phenylcyclopentadienyl group, 1,2-dimethylcyclopentadienyl group, 1,3-dimethylcyclopentadienyl group, 1,3-di(tert-butyl)cyclopentadienyl group, 1,2,3-trimethylcyclopentadienyl group, 1,2,3,4-tetramethylcyclopentadienyl group, pentamethylcyclopentadienyl group, 1-ethyl-2,3,4,5-tetramethylcyclopentadienyl group, 1-benzyl-2,3,4,5-tetramethylcyclopentadienyl group, 1-phenyl-2,3,4,5-tetramethylcyclopentadienyl group, 1-trimethylsilyl-2,3,4,5-tetramethylcyclopentadienyl group, 1-trifluoromethyl-2,3,4,5-tetramethylcyclopentadienyl group and the like. Specific examples of the substituted indenyl group include, for example, 1,2,3-trimethylindenyl group, heptamethylindenyl group, 1,2,4,5,6,7-hexamethylindenyl group and the like. Pentamethylcyclopentadienyl group is preferred as R.

The alkoxide group represented by X may be any of aliphatic alkoxy groups such as methoxy group, ethoxy group, propoxy group, n-butoxy group, isobutoxy group, sec-butoxy group and tert-butoxy group, and aryl oxide groups such as phenoxy group, 2,6-di-tert-butylphenoxy group, 2,6-diisopropylphenoxy group, 2,6-dineopentylphenoxy group, 2-tert-butyl-6-isopropylphenoxy group, 2-tert-butyl-6-neopentylphenoxy group and 2-isopropyl-6-neopentylphenoxy group. A preferred example includes 2,6-di-tert-butylphenoxy group.

The thiolate group represented by X may be any of aliphatic thiolate groups such as thiomethoxy group, thioethoxy group, thiopropoxy group, thio-n-butoxy group, thioisobutoxy group, thio-sec-butoxy group, thio-tert-butoxy group, and aryl thiolate groups such as thiophenoxy group, 2,6-di-tert-butylthiophenoxy group, 2,6-diisopropylthiophenoxy group, 2,6-dineopentylthiophenoxy group, 2-tert-butyl-6-isopropylthiophenoxy group, 2-tert-butyl-6-thioneopentylphenoxy group, 2-isopropyl-6-thioneopentylphenoxy group and 2,4,6-triisopropylthiophenoxy group. A preferred example includes 2,4,6-triisopropylthiophenoxy group.

The amido group may be any of aliphatic amido groups such as dimethylamido group, diethylamido group and diisopropylamido group, and arylamido groups such as phenylamido group, 2,6-di-tert-butylphenylamido group, 2,6-diisopropylphenylamido group, 2,6-dineopentylphenylamido group, 2-tert-butyl-6-isopropylphenylamido group, 2-tert-butyl-6-neopentylphenylamido group, 2-isopropyl-6-neopentylphenylamido group and 2,4,6-tert-butylphenylamido group. A preferred example includes 2,4,6-tert-butylphenylamido group.

The halogen atom represented by X may be any of fluorine atom, chlorine atom, bromine atom, and iodine atom. Chlorine atom and iodine atom are preferred. Specific examples of the hydrocarbon group having 1 to 20 of carbon atoms include, for example, linear or branched aliphatic hydrocarbon groups such as methyl group, ethyl group, n-propyl group, isopropyl group, n-butyl group, isobutyl group, sec-butyl group, tert-butyl group, neopentyl group, hexyl group and octyl group, aromatic hydrocarbon groups such as phenyl group, tolyl group and naphthyl group, and aralkyl groups such as benzyl group, as well as hydrocarbon groups containing a silicon atom such as trimethylsilylmethyl group and bistrimethylsilylmethyl group. Among them, methyl group, ethyl group, isobutyl group, trimethylsilylmethyl group and the like are preferred. As X, hydrogen atom, a halogen atom, or a hydrocarbon group having 1 to 20 carbon atoms is preferred.

The Lewis base compound represented by L is not particularly limited so long as said compound can coordinate to a metal by means of an electron pair, and the compound may be an inorganic compound or an organic compound. Examples of the Lewis base compound include ether compounds, ester compounds, ketone compounds, amine compounds, phosphine compounds, silyloxy compounds and the like. However, the compounds are not limited to the above examples. In the general formula (II), Q represents an element belonging to Group III in the periodic table. Examples of such an element are boron, aluminum, gallium and the like. Aluminum is preferred.

Specific examples of the metallocene type complex of a rare earth metal compound represented by the formula (I) include, for example, bispentamethylcyclopentadienylbistetrahydrofuran samarium, methylbispentamethylcyclopentadienyltetrahydrofuran samarium, chlorobispentamethylcyclopentadienyltetrahydrofuran samarium, iodobispentamethylcyclopentadienyltetrahydrofuran samarium and the like. Examples of the metallocene type complex of a rare earth metal compound represented by the formula (II) include, for example, dimethylaluminum(μ-dimethyl)bis(pentamethylcyclopentadienyl) samarium and the like.

The ionic compound used as a co-catalyst is not particularly limited so long as the compound is composed of a non-coordinate anion and a cation. Examples include, for example, ionic compounds that can react with the aforementioned rare earth metal compounds to generate a cationic transition metal compound. Examples of the non-coordinate anion include, for example, tetra(phenyl)borate, tetrakis(monofluorophenyl)borate, tetrakis(difluorophenyl)borate, tetrakis(trifluorophenyl)borate, tetrakis(trifluorophenyl)borate, tetrakis(pentafluorophenyl)borate, tetrakis(tetrafluoromethylphenyl)borate, tetra(tolyl)borate, tetra(xylyl)borate, (triphenylpentafluorophenyl)borate, [tris(pentafluorophenyl), phenyl]borate, tridecahydride-7,8-dicarbaundecaborate and the like.

Examples of the cation include, for example, carbon cations, oxonium cations, ammonium cations, phosphonium cations, cycloheptatrienyl cations, ferrocenium cations that contain a transition metal and the like. Specific examples of the carbonium cations include trisubstituted carbonium cations such as triphenylcarbonium cation and trisubstituted phenylcarbonium cations. Specific examples of the trisubstituted phenylcarbonium cations include tri(methylphenyl)carbonium cation, tri(dimethylphenyl)carbonium cation and the like. Specific examples of the ammonium cations include trialkylammonium cations such as trimethylammonium cation, triethylammonium cation, tripropylammonium cation, tributylammonium cation and tri(n-butyl)ammonium cation, N,N-dialkylanilinium cations such as N,N-diethylanilinium cation and N,N-2,4,6-pentamethylanilinium cation, dialkylammonium cations such as di(isopropyl)ammonium cation and dicyclohexylammonium cation and the like. Specific examples of the phosphonium cations include triarylphosphonium cations such as triphenylphosphonium cation, tri(methylphenyl)phosphonium cation and tri(dimethylphenyl)phosphonium cation.

Preferably used ionic compounds are those consisting of components in combination each of which is arbitrarily selected from the non-coordinate anion and the cation. Preferred examples of the ionic compound are, for example, triphenylcarbonium tetrakis(pentafluorophenyl)borate, triphenylcarbonium tetrakis(tetrafluorophenyl)borate, N,N-dimethylanilinium tetrakis(pentafluorophenyl)borate, 1,1'-dimethylferrocenium tetrakis(pentafluorophenyl)borate and the like. The ionic compounds may be used alone, or two or more of them may be used in combination. As a Lewis acid that can react with a transition metal compound to generate a cationic transition metal compound, $B(C_6F_5)_3$, $Al(C_6F_5)_3$ and the like may be used, and these acids may be used in combination with the aforementioned ionic compounds.

As the aluminoxane used as the co-catalyst, for example, those obtained by contacting an organoaluminum compound with a condensing agent can be used. More specifically, linear aluminoxanes and cyclic aluminoxanes represented by the general formula $(-Al(R')O-)_n$ can be used. In the formula, R' is a hydrocarbon group having 1 to 10 carbon atoms, and this hydrocarbon group may be substituted with a halogen atom and/or an alkoxy group. The symbol "n" represents degree of polymerization, and "n" is preferably 5 or more, more preferably 10 or more. Examples of R' include methyl group, ethyl group, propyl group, isobutyl group and the like, and methyl group is preferred. Examples of the organoaluminum compound used as a raw material of the aluminoxane include, for example, trialkylaluminum such as trimethylaluminum, triethylaluminum and triisobutylaluminum, mixtures thereof and the like, and trimethylaluminum is especially preferred. Aluminoxanes produced by using a mixture of trimethylaluminum and tributylaluminium as a raw material can also be suitably used. The aluminoxanes may be used in combination with the ionic compounds.

The catalyst composition of the present invention contains the aforementioned components (A) and (B), and may further contain an organometallic compound of an element belonging to Groups I to III in the periodic table as a component (C). Examples of the organometallic compound include organic aluminum compounds, organic lithium compounds, organic magnesium compounds, organic zinc compounds, organic boron compounds and the like. More specifically, methyllithium, butyllithium, phenyllithium, benzyllithium, neopentyllithium, trimethylsilylmethyllithium, bistrimethylsilylmethyllithium,(dibutylmagnesium, dihexylmagnesium, diethylzinc, dimethylzinc, trimethylaluminum, triethylaluminum, triisobutylaluminium, trihexylaluminium, trioctylaluminium, tridecylaluminium and the like may be used. Furthermore, organic metal halide compounds such as ethylmagnesium chloride, butylmagnesium chloride, dimethylaluminum chloride, diethylaluminum chloride, sesquiethylaluminum chloride and ethylaluminium dichloride, and hydrogenated organometallic compounds such as diethylaluminum hydride and sesquiethylaluminum hydride may be used. These organometallic compounds may be used alone, or two or more of them may be used in combination.

The mixing ratio of the aforementioned components (A) and (B) in the catalyst composition of the present invention may be suitably selected depending on the type of a monomer used for polymerization, the type and conditions of a reaction and the like. In a composition containing a rare earth metal compound and an aluminoxane, the ratio of the component (A) and the component (B) (molar ratio) is generally about 1:1 to 1:10000, preferably 1:10 to 1:1000, and more preferably 1:50 to 1:500. In a composition containing a rare earth metal compound and an ionic compound, the ratio of the component (A) and the component (B) (molar ratio) may be about 1:0.1 to 1:10, preferably 1:0.2 to 1:5, and more preferably 1:0.5 to 1:2. In a composition containing the component (C), the mixing ratio of the rare earth metal compound and the component (C) (molar ratio) may be, for example, about 1:0.1 to 1:1000, preferably 1:0.2 to 1:500, and more preferably 1:0.5 to 1:50.

The type of the conjugated diene compound as a monomer that can be polymerized by the polymerization method of present invention is not particularly limited. Examples of the monomer include, for example, 1,3-butadiene, isoprene, 1,3-pentadiene, 2-ethyl-1,3-butadiene, 2,3-dimethylbutadiene, 2-methylpentadiene, 4-methylpentadiene, 2,4-hexadiene or the like. Among them, 1,3-butadiene is preferred. These monomer components may be used alone, or two or more of them may be used in combination.

The type of the conjugated diene compound as a monomer that can be copolymerized by the polymerization method of present invention is not particularly limited. Examples of the monomer include, for example, 1,3-butadiene, isoprene, 1,3-pentadiene, 2-ethyl-1,3-butadiene, 2,3-dimethylbutadiene, 2-methylpentadiene, 4-methylpentadiene, 2,4-hexadiene or the like. Among them, 1,3-butadiene is preferred. These monomer components may be used alone, or two or more of them may be used in combination.

The type of the aromatic vinyl compound monomer that can be copolymerized by the polymerization method of present invention is not also particularly limited, and it may be, for example, styrene, p-methylstyrene, m-methylstyrene, p-tert-butylstyrene, α-methylstyrene, chloromethylstyrene, p-tert-butoxystyrene, dimethylaminomethylstyrene, dimethylaminoethylstyrene, vinyltoluene or the like. Among them, styrene is preferred. These monomer components may be used alone, or two or more of them may be used in combination.

The polymerization method of the present invention may be performed either in the presence or absence of a solvent. Where a solvent is used, the kind of the solvent is not particularly limited so long as the solvent is substantially inactive in the polymerization reaction and has sufficient solubility for the monomer and the catalyst composition. Examples of the solvent include, for example, saturated aliphatic hydrocarbons such as butane, pentane, hexane and heptane; saturated cycloaliphatic hydrocarbons such as cyclopentane and cyclohexane; monoolefins such as 1-butene and 2-butene; aromatic hydrocarbons such as benzene and toluene; halogenated hydrocarbons such as methylene chloride, chloroform, carbon tetrachloride, trichloroethylene, perchloroethylene, 1,2-dichloroethane, chlorobenzene, bromobenzene and chlorotoluene. Among them, toluene is preferred. Two or more solvents may be used in combination.

Polymerization temperature in the polymerization method of the present invention may be, for example, in the range of from −100° C. to 100° C., preferably in the range of from −50° C. to 80° C. Polymerization time may be, for example, about 1 minute to 12 hours, preferably about 5 minutes to 5 hours. However, these reaction conditions may be suitably selected depending on the type of monomers and the type of the catalyst composition, and they are not limited to the ranges exemplified above. After the polymerization reaction reaches to a given polymerization degree, the reaction may be stopped by adding a known polymerization terminator to the polymerization system, and then a produced polymer may be separated from the reaction system in a conventional manner.

The content of the cis-configuration in the microstructure of the polymer obtained by the polymerization method for a conjugated diene of the present invention may generally be 80 mol % or more, preferably 90 mol % or more, more preferably 95 mol % or more, and most preferably 98 mol % or more. As for the molecular weight distribution, Mw/Mn may be 2.00 or less, preferably 1.80 or less, more preferably 1.60 or less, further preferably 1.40 or less, and most preferably 1.30 or less.

The content of the cis-configuration in the microstructure of the copolymer obtained by the copolymerization method of the present invention may generally be 80 mol % or more, preferably 90 mol % or more, and most preferably 95 mol % or more. The molecular weight Mn may be 10,000 or more, preferably 20,000 or more, more preferably 50,000 or more, and most preferably 100,000 or more, and the molecular weight distribution Mw/Mn may be 2.50 or less, preferably 2.00 or less, more preferably 1.80 or less, and most preferably 1.50 or less. The copolymer of the present invention is a random copolymer that shows a substantially randomized monomer sequence.

The polymers of present invention are expected to have superior thermal characteristics (thermal stability and the like) and mechanical properties (tensile modulus, bending modulus and the like), and therefore, they can be utilized for various applications as polymeric materials.

EXAMPLES

The present invention will be explained more specifically with reference to the following examples. However, the scope of the present invention is not limited to these examples.

Microstructures of polybutadiene referred to in the examples were calculated from integration ratios of peaks observed by $^1$H NMR and $^{13}$C NMR [$^1$H NMR: δ 4.8–5.0 (=CH$_2$ of 1,2-vinyl unit), 5.2–5.8 (—CH= of 1,4-unit and —CH= of 1,2-vinyl unit), $^{13}$C NMR: δ 27.4 (1,4-cis unit), 32.7 (1,4-trans unit), 127.7–131.8 (1,4-unit), 113.8–114.8 and 143.3–144.7 (1,2-vinyl unit)]. Styrene contents referred to in the examples were calculated from integration ratios of the peaks obtained by $^1$H NMR [δ 4.8–5.0 (=CH$_2$ of 1,2-vinyl unit in butadiene), δ 5.2–5.8 (—CH= of 1,4-viny and 1,2-vinyl unit in butadiene) and δ 6.3–7.3 (aromatic ring of styrene unit)]. The weight average molecular weights (Mw), number average molecular weights (Mn) and molecular weight distributions (Mw/Mn) were obtained by gel permeation chromatography using polystyrene as a standard substance.

Example 1

In a glove box under nitrogen atmosphere, 0.01 mmol of bispentamethylcyclopentadienylbistetrahydrofuran samarium [(Cp*)$_2$Sm(THF)$_2$] (Cp*: pentamethylcyclopentadienyl ligand)] was put into a sufficiently dried 30-ml pressure glass bottle, and dissolved in 6 ml of toluene. Then, MMAO (toluene-soluble aluminoxane sold by TOSOH and Akzo Co.) was added into the bottle so that the elemental ratio of Al/Sm became 200, and the bottle was sealed with a stopper. The bottle was then taken out from the glove box, and 1.5 g of 1,3-butadiene was put into the bottle, and then polymerization was carried out for 5 minutes at 50° C. After the polymerization, 10 ml of methanol containing 10 wt % BHT [2,6-bis(tert-butyl)-4-methylphenol] was added to the reaction system to stop the reaction. The polymer was separated by using a larger amount of a mixed solvent of methanol/hydrochloric acid, and dried at 60° C. in vacuo. The yield of the resulting polymer was 65 wt %. The cis-content in the microstructure of the polymer was 98.8 mol %. The number average molecular weight was 401,000 and Mw/Mn was 1.82.

Example 2

In a glove box under nitrogen atmosphere, 0.01 mmol of methylbispentamethylcyclopentadienyltetrahydrofuran samarium [(Cp*)$_2$SmMe(THF)] was put into a sufficiently dried 30-ml pressure glass bottle, and dissolved in 6 ml of toluene. Then, MMAO was added into the bottle so that the elemental ratio Al/Sm became 200, and the bottle was sealed with a stopper. The bottle was then taken out from the glove box and 1.5 g of 1,3-butadiene was put into the bottle, and polymerization was carried out at 50° C. for 15 minutes. After the polymerization, 10 ml of methanol containing 10 wt % BHT was added to the reaction system to stop the reaction. The polymer was separated by using a larger amount of a mixed solvent of methanol/hydrochloric acid, and dried at 60° C. in vacuo. The yield of the resulting polymer was 86 wt %. The cis-content in the microstructure of the polymer was 98.0 mol %. The number average molecular weight was 1,260,000 and Mw/Mn was 1.82.

Example 3

In a glove box under nitrogen atmosphere, 0.01 mmol of bispentamethylcyclopentadienylbistetrahydrofuran samarium [(Cp*)$_2$Sm(THF)$_2$] was put into a sufficiently dried 30-ml pressure glass bottle, and dissolved in 6 ml of toluene. Then, 0.1 mmol of triisobutylaluminum and 0.01 mmol of triphenylcarbonium tetrakis(pentafluorophenyl)borate (Ph$_3$CB(C$_6$F$_5$)$_4$) were added into the bottle, and the bottle was sealed with a stopper. The bottle was then taken out from the glove box and 1.5 g of 1,3-butadiene was put into the bottle, and polymerization was carried out at 50° C. for 10 minutes. After the polymerization, 10 ml of methanol containing 10 wt % BHT was added to the reaction system to stop the reaction. The polymer was separated by using a larger amount of a mixed solvent of methanol/hydrochloric acid, and dried at 60° C. in vacuo. The yield of the resulting polymer was 78 wt %. The cis-content in the microstructure of the polymer was 95.0 mol %. The number average molecular weight was 263,000 and Mw/Mn was 1.34.

Example 4

In a glove box under nitrogen atmosphere, 0.01 mmol of dimethylaluminum(μ-dimethyl)bis(pentamethylcyclopentadienyl) samarium [(Cp*)$_2$Sm(μ-Me)$_2$AlMe$_2$] was put into a sufficiently dried 30-ml pressure glass bottle, and dissolved in 6 ml of toluene. Then, 0.03 mmol of triisobutylaluminum and 0.01 mmol of triphenylcarbonium tetrakis(pentafluorophenyl)borate (Ph$_3$CB(C$_6$F$_5$)$_4$) were added into the bottle, and the bottle was sealed with a stopper. The bottle was then taken out from the glove box and 1.5 g of 1,3-butadiene was put into the bottle, and polymerization was carried out at 50° C. for 5 minutes. After the polymerization, 10 ml of methanol containing 10 wt % BHT was added to the reaction system to stop the reaction. The polymer was separated by using a larger amount of a mixed solvent of methanol/ hydrochloric acid, and dried at 60° C. in vacuo. The yield of the resulting polymer was 94 wt %. The cis-content in the microstructure of the polymer was 90.0 mol %. The number average molecular weight was 429,500 and Mw/Mn was 1.56.

Example 5

In a glove box under nitrogen atmosphere, 0.03 mmol of dimethylaluminum-(μ-dimethyl)bis(pentamethylcyclopentadienyl) samarium [(Cp*)$_2$Sm(μ-Me)$_2$AlMe$_2$] (Cp*: pentamethylcyclopentadienyl ligand) was put into a sufficiently dried 30-ml pressure glass bottle, and dissolved in 1 ml of toluene. Then, 0.09 mmol of triisobutylaluminum and 0.03 mmol of triphenylcarbonium tetrakis(pentafluorophenyl)borate (Ph₃CB(C₆F₅)₄) were added into the bottle, and the bottle was sealed with a stopper. The bottle was then taken out from the glove box and 0.97 g of 1,3-butadiene and 1.4 ml of styrene were put into the bottle, and polymerization was carried out at 50° C. for 30 minutes. After the polymerization, 10 ml of methanol containing 10 wt % BHT [2,6-bis(tert-butyl)-4-methylphenol] was added to the reaction system to stop the reaction. The polymer was separated by using a larger amount of a mixed solvent of methanol/hydrochloric acid, and dried at 60° C. in vacuo. The yield of the resulting polymer was 21 wt %. The styrene content in the polymer was 4.6 mol % and the cis-content in the microstructure of the butadiene units was 94.6 mol %. The number average molecular weight was 101,000 and Mw/Mn was 1.41.

Example 6

A polymer was obtained in the same manner as in Example 5 except that 0.81 g of 1,3-butadiene and 1.7 ml of styrene were used, and polymerization was carried out at 50° C. for 1 hour. The yield of the resulting polymer was 22 wt %. The styrene content in the polymer was 7.2 mol % and the cis-content in the microstructure of the butadiene units was 95.1 mol %. The number average molecular weight was 78,600 and Mw/Mn was 1.59.

Example 7

A polymer was obtained in the same manner as in Example 5 except that 0.65 g of 1,3-butadiene and 2.0 ml of styrene were used, and polymerization was carried out at 50° C. for 6 hours. The yield of the resulting polymer was 20 wt %. The styrene content in the polymer was 11.4 mol % and the cis-content in the microstructure of the butadiene units was 91.7 mol %. The number average molecular weight was 73,900 and Mw/Mn was 1.69.

Example 8

A polymer was obtained in the same manner as in Example 5 except that 0.49 g of 1,3-butadiene and 2.4 ml of styrene were used, and polymerization was carried out at 50° C. for 12 hours. The yield of the resulting polymer was 23 wt %. The styrene content in the polymer was 19.1 mol % and the cis-content in the microstructure of the butadiene units was 87.4 mol %. The number average molecular weight was 38,700 and Mw/Mn was 1.75.

Example 9

A polymer was obtained in the same manner as in Example 5 except that 0.32 g of 1,3-butadiene and 2.8 ml of styrene were used, and polymerization was carried out at 50° C. for 50 hours. The yield of the resulting polymer was 21 wt %. The styrene content in the polymer was 33.2 mol % and the cis-content in the microstructure of the butadiene units was 80.3 mol %. The number average molecular weight was 23,400 and Mw/Mn was 2.23.

The results of Examples 5 to 9 are summarized in the following Table 1.

TABLE 1

| Amount of St used (mol %) | Polymerization time (h) | Yield (%) | Microstructure | | | St content (%) | Mw | Mn | Mw/Mn |
| | | | 1,4-cis (%) | 1,4-trans (%) | 1,2- (%) | | | | |
|---|---|---|---|---|---|---|---|---|---|
| 40 | 0.5 | 21 | 94.6 | 4.4 | 1.0 | 4.6 | 142,000 | 101,000 | 1.41 |
| 50 | 1 | 22 | 95.1 | 3.9 | 1.0 | 7.2 | 124,800 | 78,600 | 1.59 |
| 60 | 6 | 20 | 91.7 | 7.2 | 1.1 | 11.4 | 124,200 | 73,900 | 1.69 |
| 70 | 12 | 23 | 87.4 | 11.7 | 0.9 | 19.1 | 67,800 | 38,700 | 1.75 |
| 80 | 50 | 21 | 80.3 | 18.7 | 1.0 | 33.2 | 52,200 | 23,400 | 2.23 |

INDUSTRIAL AVAILABILITY

By polymerizing a conjugated diene using the catalyst composition of present invention, a polymer can be obtained which has an extremely high content of cis-1,4-configuration in the microstructure and a narrow molecular weight distribution. Further, by using the catalyst composition of present invention, a random copolymer can be obtained using a conjugated diene and an aromatic vinyl compound which has a high content of cis-1,4-configuration in the microstructure, a high molecular weight, and a narrow molecular weight distribution.

What is claimed is:

1. A catalyst composition for polymerization of a conjugated diene, which is used for obtaining a polymer wherein a cis-1,4-configuration content in the microstructure is 80 mol % or more and a molecular weight distribution Mw/Mn is 2.00 or less, which comprises the following components:

(A) a metallocene-type complex of the formula:

$$R_a MX_b \cdot L_c \qquad \text{I:}$$

$$R_a MX_b QX_b \qquad \text{II:}$$

wherein:
  each M is independently a rare earth metal,
  each R is independently a cyclopentadienyl group with five substituents,
  X is H, halogen, alkoxide, thiolate, amido, or a $C_{1-20}$ hydrocarbon,
  L is a Lewis base,
  Q is an element of Group III,
  a is 2,
  b is 0, 1 or 2, and
  c is 0, 1 or 2
and
(B) an ionic compound composed of a non-coordinate anion and a cation and/or an aluminoxane.

2. The catalyst composition according to claim 1, wherein the metallocene-type complex is a samarium complex.

3. The catalyst composition according to claim 1 wherein the ionic compound is triphenylcarbonium tetrakis(pentafluorophenyl) borate, triphenylcarbonium tetrakis(tetrafluorophenyl)borate, N,N-dimethylanilinium tetrakis(pentafluorophenyl)borate or 1,1'-dimethylferrocenium tetrakis(pentafluorophenyl)borate.

4. The catalyst composition according to claim 1, which further comprises an organometallic compound of an element belonging to Group I to Group III in the periodic table.

5. A method for polymerization of a conjugated diene wherein the polymerization is performed in the presence of the catalyst composition according to claim 1.

6. A catalyst composition for copolymerization of a conjugated diene and an aromatic vinyl compound, which is used for obtaining a copolymer wherein a cis-1,4-configuration content in the microstructure is 80 mol % or more or and a molecular weight distribution Mw/Mn is 2.00 or less, which comprises the following components:

(A) a metallocene-type complex of the formula:

 I:

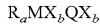 II:

wherein:
  each M is independently a rare earth metal,
  each R is independently a cyclopentadienyl group with five substituents,
  X is H, halogen, alkoxide, thiolate, amido, or a $C_{1-20}$ hydrocarbon,
  L is a Lewis base,
  Q is an element of Group III,
  a is 2,
  b is 0, 1 or 2, and
  c is 0, 1 or 2,
  and
(B) an ionic compound composed of a non-coordinate anion and a cation, with the proviso that the catalyst composition does not contain an aluminoxane.

7. The catalyst composition according to claim 6, wherein the metallocene-type complex is a samarium complex.

8. The catalyst composition according to claim 6, wherein the ionic compound is triphenylcarbonium tetrakis(pentafluorophenyl)borate, triphenylcarbonium tetrakis(tetrafluorophenyl)borae, N,N-dimethylanilinium tetrakis(pentafluorophenyl)borate or 1,1'-dimethylferrocenium tetrakis(pentafluorophenyl)borate.

9. The catalyst composition according to claim 6, which further comprises an organometallic compound of an element belonging to Group I to Group III in the periodic table.

10. A method for copolymerization of a conjugated diene and an aromatic vinyl compound wherein the copolymerization is performed in the presence of the catalyst composition according to claim 6.

11. The catalyst composition according to claim 1, wherein R is pentamethylcyclopentadienyl, 1-ethyl-2,3,4,5-tetramethylcyclopentadienyl, 1-benzyl-2,3,4,5-tetramethylcyclopentadienyl, 1-phenyl-2,3,4,5-tetramethylcyclopentadienyl, 1-trimethylsilyl-2,3,4,5-tetramethylcyclopentadienyl, or 1-trifluoromethyl-2,3,4,5-tetramethylcyclopentadienyl.

12. The catalyst composition according to claim 1, wherein R is pentamethylcyclopentadienyl.

13. The catalyst composition according to claim 1, wherein (A) is bispentamethylcyclopentadienylbistetrahydrofuran samarium, methylbispentamethylcyclopentadienyltetrahydrofuran samarium, chlorobispentamethylcyclopentadienyltetrahydrofuran samarium, iodobispentamethylcyclopentadienyltetrahydroguran samarium or dimethylaluminium (μ-dimethyl)bis(pentamethylcyclopentadienyl) samarium.

14. The catalyst composition according to claim 6, wherein R is pentamethylcyclopentadienyl, 1-ethyl-2,3,4,5-tetramethylocyclopentadienyl, 1-benzyl-2,3,4,5-tetramethylcyclopentadienyl, 1-phenyl-2,3,4,5-tetramethylcyclopentadienyl, 1-trimethylsilyl-2,3,4,5-tetramethylcyclopentadienyl, or 1-trifluoromethyl-2,3,4,5-tetramethylcyclopentadienyl.

15. The catalyst composition according to claim 6, wherein R is pentamethylcyclopentadienyl.

16. The catalyst composition according to claim 6, wherein (A) is bispentamethylcyclopentadienylbistetrahydrofuran samarium, methylbispentamethylcyclopentadienyltetrahydrofuran samarium, chlorobispentamethylcyclopentadienyltetrahydrofuran samarium, iodobispentamethylcyclopentadienyltetrahydrofuran samarium or dimethylaluminium (μ-dimethyl)bis(pentamethylcyclopentadienyl) samarium.

17. A method according to claim 10, in which a copolymer is produced having a cis-1,4-configuration content in the microstructure of 80 mol % or more or and a molecular weight distribution Mw/Mn of 2.00 or less.

* * * * *